(12) United States Patent
Lawrence et al.

(10) Patent No.: US 11,566,592 B2
(45) Date of Patent: Jan. 31, 2023

(54) FLUID SUPPLY SYSTEM HAVING SHUTOFF VALVE WITH STABILIZED ELECTRICAL VALVE ACTUATOR

(71) Applicant: Caterpillar Inc., Peoria, IL (US)

(72) Inventors: Rodney Allen Lawrence, Frankfort, IN (US); Brandyn Anthony Stack, Lafayette, IN (US); Joseph John Stabnik, Rensselaer, IN (US); Keith Thomas Igoe, Carver, MN (US); Eric Ferguson, Cottage Grove, MN (US)

(73) Assignee: Caterpillar Inc., Peoria, IL (US)

( * ) Notice: Subject to any disclaimer, the term of this patent is extended or adjusted under 35 U.S.C. 154(b) by 83 days.

(21) Appl. No.: 17/319,202

(22) Filed: May 13, 2021

(65) Prior Publication Data

US 2021/0270218 A1 Sep. 2, 2021

Related U.S. Application Data

(62) Division of application No. 15/940,469, filed on Mar. 29, 2018, now Pat. No. 11,028,806.

(51) Int. Cl.
*F16F 7/104* (2006.01)
*F02M 35/10* (2006.01)
(Continued)

(52) U.S. Cl.
CPC ... *F02M 35/10255* (2013.01); *F02D 41/0007* (2013.01); *F16F 7/104* (2013.01);
(Continued)

(58) Field of Classification Search
CPC ..... F02M 35/10255; F02D 11/04; F02D 9/16; F02D 2009/0245; F02D 17/04; F16K 1/304; F16K 1/2007; F16K 31/563; F16K 31/0668; F16K 31/105; F16K 3/06; F16K 3/0254; F02B 33/44; F02B 37/007;
(Continued)

(56) References Cited

U.S. PATENT DOCUMENTS 3,237,916 A ‡ 3/1966 Bryant ................ F16K 31/1635
251/158
4,537,386 A ‡ 8/1985 Krepela .................. F02D 17/04
251/302
(Continued)

FOREIGN PATENT DOCUMENTS

EP 757166 B1 ‡ 11/2000
EP 0757166 B1 11/2000

*Primary Examiner* — Mary E McManmon
*Assistant Examiner* — Andrew J Rost
(74) *Attorney, Agent, or Firm* — Brannon Sowers & Cracraft PC

(57) ABSTRACT

A fluid supply system for a machine such as an internal combustion engine includes a shutoff valve having an electrical actuator that includes a solenoid subassembly, and a stabilizer for the electrical valve actuator. The stabilizer includes a fitting structured to couple the shutoff valve to adjacent hardware in the fluid supply system, and a strongarm extending between the fitting and the solenoid assembly and clamped to the solenoid subassembly. A vibration-damping reinforced grommet may be clamped between the solenoid subassembly and the clamp.

20 Claims, 4 Drawing Sheets

FIG. 5

(51) Int. Cl.
  *F16K 31/56* (2006.01)
  *F16K 1/30* (2006.01)
  *F02D 41/00* (2006.01)
  *F02D 11/04* (2006.01)
  *F16K 1/20* (2006.01)

(52) U.S. Cl.
  CPC ............ *F16K 1/304* (2013.01); *F16K 31/563* (2013.01); *F02D 11/04* (2013.01); *F16K 1/2007* (2013.01)

(58) Field of Classification Search
  CPC . F02B 37/001; F16F 7/10; F16F 7/104; F16F 15/021
  See application file for complete search history.

(56) References Cited

U.S. PATENT DOCUMENTS

| | | | | |
|---|---|---|---|---|
| 6,032,921 A ‡ | 3/2000 | Krepela | ............... | F02D 9/06 123/198 F |
| 6,719,108 B2 * | 4/2004 | Hasegawa | ............... | B60G 7/001 267/141 |
| 6,925,803 B2 ‡ | 8/2005 | Natali | ............... | F02B 37/12 251/129.2 |
| 7,232,017 B2 * | 6/2007 | Minor | ............... | H02G 7/14 74/574.2 |
| 7,444,982 B2 ‡ | 11/2008 | Rivet | ............... | F02D 9/107 123/198 D |
| 8,281,863 B2 ‡ | 10/2012 | Voss | ............... | F16K 3/0254 166/351 |
| 10,113,491 B2 ‡ | 10/2018 | Stabnik | ............... | F02D 9/14 |
| 10,612,687 B2 ‡ | 4/2020 | Lawrence | ............... | F16K 3/06 |
| 10,642,288 B2 ‡ | 5/2020 | Middlebrook | ............... | F16K 31/047 |
| 2003/0056754 A1 ‡ | 3/2003 | Prysko | ............... | F02D 17/04 123/394 |
| 2011/0006235 A1 ‡ | 1/2011 | Williams | ............... | F16K 51/02 251/301 |
| 2015/0315983 A1 | 11/2015 | Schacher et al. | | |
| 2016/0265419 A1 * | 9/2016 | Pelei | ............... | F02B 29/045 |
| 2017/0314485 A1 ‡ | 11/2017 | Chen | ............... | F02D 41/042 |

\* cited by examiner
‡ imported from a related application

FLUID SUPPLY SYSTEM HAVING SHUTOFF VALVE WITH STABILIZED ELECTRICAL VALVE ACTUATOR

TECHNICAL FIELD

The present disclosure relates generally to a shutoff valve in a fluid supply system for a machine, and more particularly to a vibration-limiting stabilizer system for an electrical valve actuator in a shutoff valve.

BACKGROUND

All manner of shutoff valves are used in fluid systems to interrupt flow of fluid to a target. Shutting off the flow may be for purposes of avoiding overfilling a storage vessel or the like, halting draining, or for a variety of other purposes. In internal combustion engine systems, it can be desirable in certain applications to provide a mechanism for rapidly shutting off a supply of air to the engine. Various strategies for engine shutdown have been proposed over the years. It has been observed, however, that starving the engine of air is commonly the most effective and reliable way to stop operation quickly.

Engines used in certain environments where combustible gases are present can present a particular need for rapid engine shutdown. At a wellhead, for example, combustible gases such as natural gas can sometimes leak or otherwise escape from a bore hole or containment vessel. Engines operating in such environments can end up being supplied with extra fuel in the form of natural gas entering the air intake system, having undesirable consequences such as engine overspeeding. In other instances, engines can overspeed on other combustible fuel such as wood chips, alcohol, gasoline vapors, hydrogen, in enriched oxygen atmospheres, or even on their own oil supply or fuel supply such as in the case of a stuck fuel rack or the like.

Swing gate air shutoff valves, for instance, provide a gate that pivots within a housing to obstruct an air supply conduit in an engine air intake system. Such shutoff valves can experience relatively harsh conditions including vibration excitation from the engine, and temperature extremes. United States Patent Application Publication No. 2015/0315983 relates to a method and apparatus for shutting down an engine by selectively preventing air from passing into the air intake. According to the '983 Publication, a valve in the nature of a butterfly valve is electromagnetically actuated to move to a closed position to prevent air from passing into the engine air intake once one or more predetermined engine conditions have been detected. While the disclosed strategy may have certain applications, there are likely disadvantages relating to reliability, false tripping, or performance degradation over time.

SUMMARY OF THE INVENTION

In one aspect, a fluid supply system for a machine includes a shutoff valve including a valve housing having an outer housing surface, an inner housing surface forming a fluid supply conduit for supplying a fluid to the machine, and an actuator bore that opens at the outer housing surface. The shutoff valve further includes a valve member movable within the valve housing from an open position to a closed position, to shut off fluid flow through the fluid supply conduit, and an electrical valve actuator extending through the actuator bore. The electrical valve actuator includes a solenoid subassembly supported by the valve housing and extending outboard of the actuator bore. The fluid supply system further includes a stabilizer for the electrical valve actuator including a fitting coupled to the valve housing and forming an opening to the fluid supply conduit, a strongarm extending between the fitting and the solenoid subassembly, and a clamp clamping the strongarm to the solenoid subassembly.

In another aspect, a machine system includes a machine, and a fluid supply system including a shutoff valve having a valve housing forming a fluid supply conduit, for supplying a fluid to the machine, and an actuator bore. The shutoff valve includes a valve member movable within the valve housing from an open position to a closed position, to shut off fluid flow through the fluid supply conduit, and an electrical valve actuator extending through the actuator bore. The electrical valve actuator includes a solenoid subassembly supported at a location outside of the valve housing. The machine system further includes a stabilizer for the electrical valve actuator having a fitting coupled to the valve housing and forming an opening to the fluid supply conduit, a strongarm extending between the fitting and the solenoid subassembly, and a clamp clamping the strongarm to the solenoid subassembly.

In still another aspect, a vibration-limiting stabilizer system for an electrical valve actuator in a shutoff valve of the fluid supply system includes a stabilizer having a fitting with a tube section forming a fluid supply conduit and extending between a first mounting flange structured to couple with a valve housing of the shutoff valve and a second mounting flange. The stabilizer further includes a strongarm attached to the fitting and including a first side wall connected to the first mounting flange, and a second side wall connected to the second mounting flange. The first side wall and the second side wall extend outwardly from the first mounting flange and the second mounting flange, respectively, to a clamp mount. The stabilizer further includes a clamp positionable upon the clamp mount and including at least one clamping element structured for clamping a solenoid assembly of the electrical valve actuator to the strongarm.

DETAILED DESCRIPTION

Figure 1:
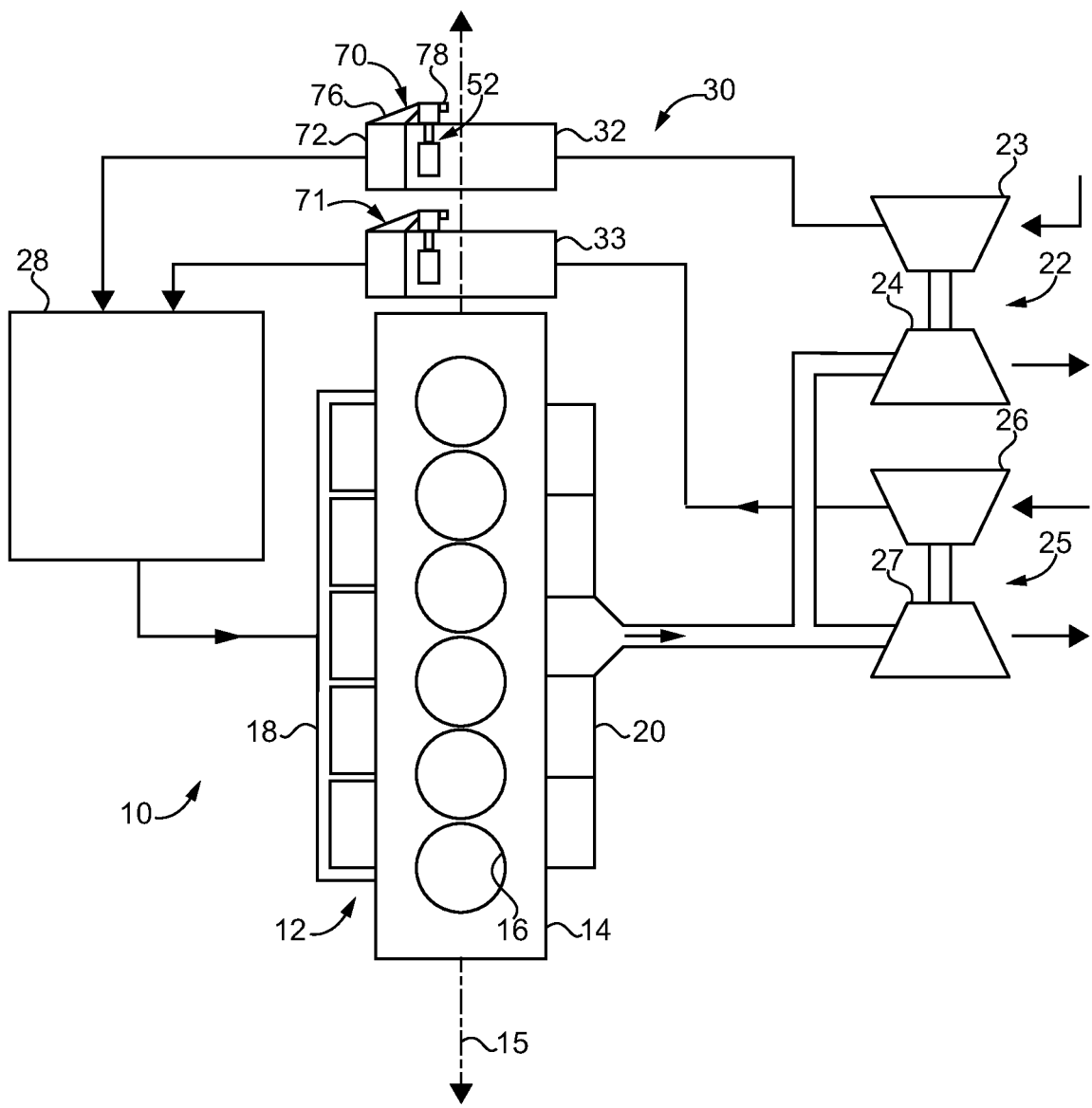
FIG. 1 is a schematic illustration of a machine system, according to one embodiment.

Referring to FIG. 1, there is shown a machine system 10 according to one embodiment, and illustrated in the context of an internal combustion engine system such as might be used for electrical power generation, propulsion power in a mobile machine, operating a pump or compressor, or in a variety of other applications. Machine system 10 (hereinafter "system 10") includes a machine 12 such as an internal combustion engine. Machine or engine 12 (hereinafter "engine 12") includes an engine housing 14 having a plurality of cylinders 16 formed therein. A plurality of pistons (not shown) may be movable one within each of cylinders 16 to rotate a crankshaft in a generally conventional manner. A crankshaft centerline is shown at 15. An intake manifold 18 is coupled with housing 14, as is an exhaust manifold 20. System 10 can further include a first turbocharger 22 having a compressor 23, and a turbine 24, structured to compress and supply a fluid such as air or air mixed with other fluids, to intake manifold 18. A second turbocharger 25 having a compressor 26 and a turbine 27 may be provided fluidly in parallel with turbocharger 22. A single turbocharger design, multiple sequential turbocharger stages, or still other arrangements are contemplated within the present context. Turbines 24 and 27 can receive hot exhaust gases from exhaust manifold 20, and rotate to induce rotation of compressors 23 and 26 to provide a flow of intake air to engine 12 in a generally known manner. An aftercooler 28 may be positioned fluidly between compressors 23 and 26 and receives parallel streams of compressed air for feeding to engine 12. Engine 12 may be coupled with a transmission and/or any other variety of torque transfer devices and loads. One application contemplated for the present disclosure is at a wellhead, on a frac rig, or an offshore oil or gas platform. As noted above, these and other environments can experience the presence of fugitive combustible gases, and it can be desirable to provide one or more mechanisms for shutting off airflow to engine 12 in the case of engine overspeeding or other problems that can result from the presence of combustible fluids or other materials in the stream of intake air for combustion.

System 10 further includes a fluid supply system 30 that is coupled with turbochargers 22 and 25 and positioned fluidly between turbochargers 22 and 25 and aftercooler 28. Fluid supply system 30 includes a shutoff valve 32, and in the illustrated embodiment two shutoff valves 32 and 33, structured for shutting off flow of intake air from a corresponding one of compressors 23 and 26. It can be noted that each shutoff valve 32 and 33 is positioned generally over crankshaft centerline 15. Locations several feet above crankshaft centerline 15, approximately as shown, as well as numerous other mounting locations in or on an engine system, can experience significant vibration. Vibrations, and otherwise harsh conditions of high temperatures, temperature cycling, and thermal fatigue and/or wear-inducing conditions generally, can be associated with shutoff valve performance degradation, false tripping, and unreliability over time. Certain engines can be expected to operate continuously for hundreds of hours, and commonly thousands of hours between service intervals. As will be further apparent from the following description shutoff valves 32 and 33, and associated components in particular, are contemplated to be resistant to undesired phenomena such as wear, false tripping, and still others.

Figure 2:
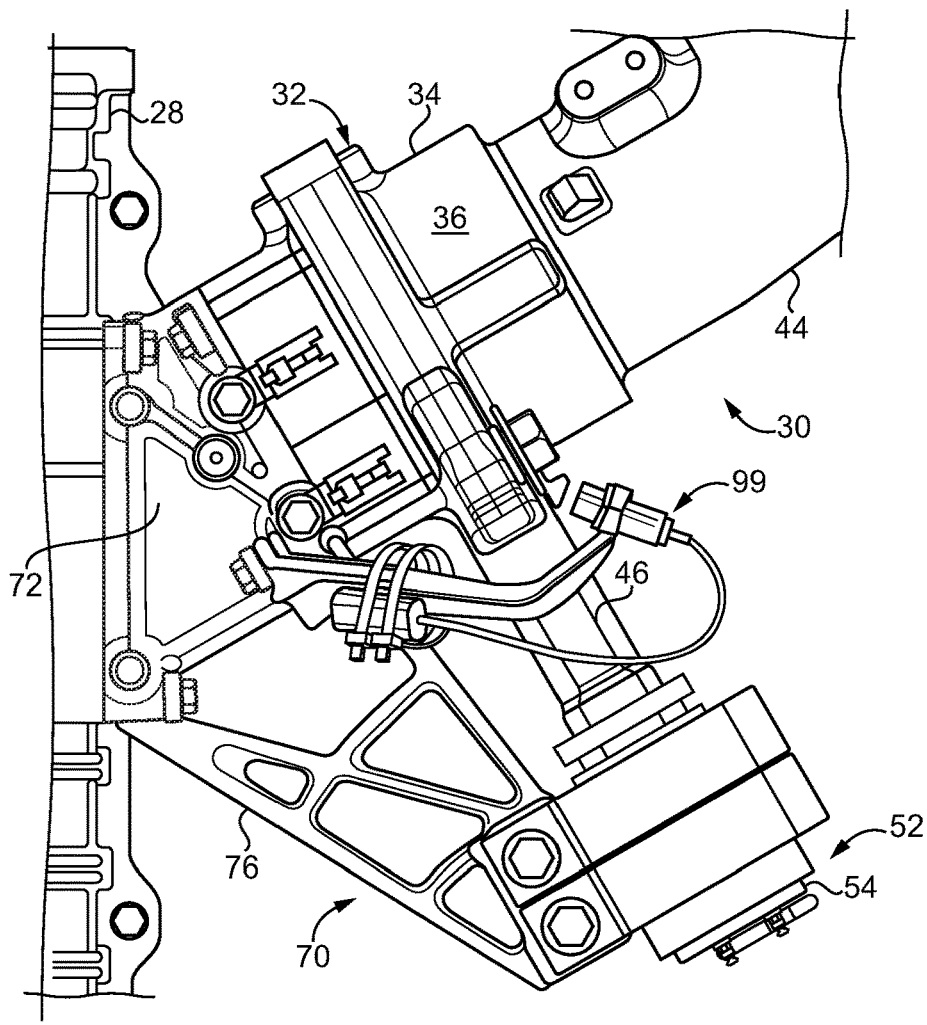
FIG. 2 is a diagrammatic illustration of a fluid supply system suitable for use in the machine system of FIG. 1, according to one embodiment.
Figure 3:
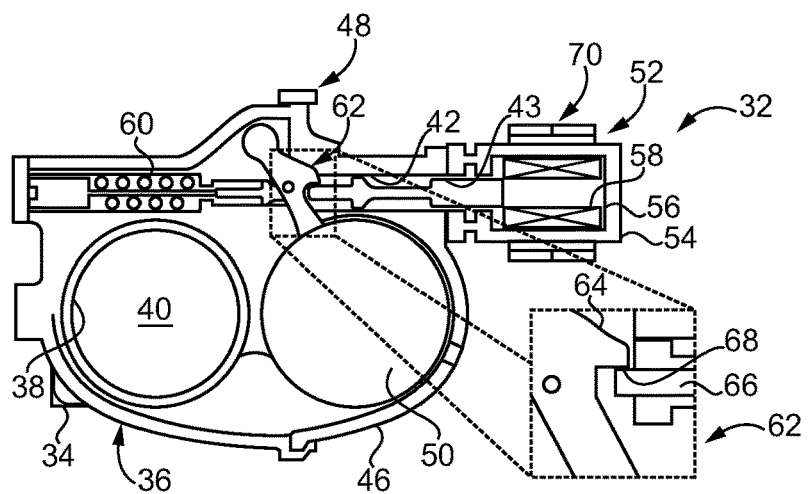
FIG. 3 is a sectioned diagrammatic view, including a detailed enlargement, through a shutoff valve and shutoff valve stabilizer, according to one embodiment.

Referring also now to FIGS. 2 and 3, there are shown, respectively, a top view of fluid supply system 30 and a sectioned view through shutoff valve 32 illustrating certain features in additional detail. Shutoff valve 32 can include a valve housing 34 having an outer housing surface 36, an inner housing surface 38 forming a fluid supply conduit 40 for supplying a fluid to engine 12, and an actuator bore 42 that opens at outer housing surface 36. An outer bore end 43 is shown in FIG. 3. It can also be seen from the FIG. 2 illustration that shutoff valve 32 is positioned fluidly between an intake pipe 44 or the like and an adjoining housing in fluid supply system 30, which in the illustrated case is a housing of aftercooler 28. The description herein of shutoff valve 32 should be understood to refer analogously to shutoff valve 33 and associated components, which can be identical to those of shutoff valve 32 except certain parts being mirror images. In other instances, two or more shutoff valves in a machine system could be identical to one another. It can further be noted that valve housing 34 can include an actuator housing portion 46 that is coupled to a main valve housing portion (not numbered) by way of a bolted joint 48. Shutoff valve 32 can further include a valve member 50 movable within valve housing 34 from an open position to a closed position, to shut off fluid flow through fluid supply conduit 40, and an electrical valve actuator 52 extending through actuator bore 42. In the illustrated embodiment, valve member 50 includes a gate valve member that swings across fluid supply conduit 40 from the open position, approximately as shown in FIG. 3, to the closed position. Rather than a swinging or pivoting gate valve, in other embodiments a butterfly-type valve or still another valve type might be used.

Shutoff valve 32 may further include a valve-actuating spring 60 held in an energized state, such as a compressed state, within valve housing 34. Shutoff valve 32 may also include a latching mechanism 62 including a latch 64 latching valve member 50 open in opposition to a biasing force produced by valve-actuating spring 60. Electrical valve actuator 52 may also include a pin 66 engaged with latching mechanism 62 and structured to disengage from latching mechanism 62 in response to changing an electrical energy state, such as by energizing or de-energizing, electrical valve actuator 52. A latching surface 68 of valve member 50 can be shown in the detailed enlargement of FIG. 3 engaged with pin 66.

Electrical valve actuator 52 also includes a solenoid subassembly 54 supported by valve housing 34 and extending outboard of actuator bore 42. In an implementation solenoid subassembly 54 can project generally outwardly from actuator bore 42 in a manner that could be understood to be cantilever supported, generally along an axis (not numbered) of actuator bore 42. Solenoid subassembly 54 can include a housing 56 with a solenoid 58 positioned therein. Energizing solenoid 58 can cause pin 66 to move toward solenoid 58 when energized, and allowing valve-actuating spring 60 to cause valve member 50 to swing or pivot from the open position to the closed position. Latching surface 68 can be seen in contact with pin 66 in the detailed enlargement.

It will be recalled that vibrational phenomena can be significant and relentless given the design of shutoff valve 32 and its particular placement and positioning in a dynamic environment such as system 10. Wear in the vicinity of a surface configured analogously to latching surface 68, and wear on the associated pin due to such vibrational phenomena has been observed in earlier systems, and may contribute to undesired conditions or events such as false tripping of a shutoff valve. It will also be recalled that solenoid subassembly 54 is supported outboard of actuator bore 42, and in such a manner as to project outwardly of valve housing 34. It can be desirable to have a relatively robust and therefore heavy solenoid for shutoff valve actuation and, for this and other reasons, solenoid subassembly 54 could be expected to bend, reciprocate, twist, or experience other deflections during service. The present disclosure provides a strategy for minimizing such deflections and the potential effect on the structure and functioning of shutoff valve 32 by way of a unique support strategy for electrical valve actuator 52.

Figure 4:
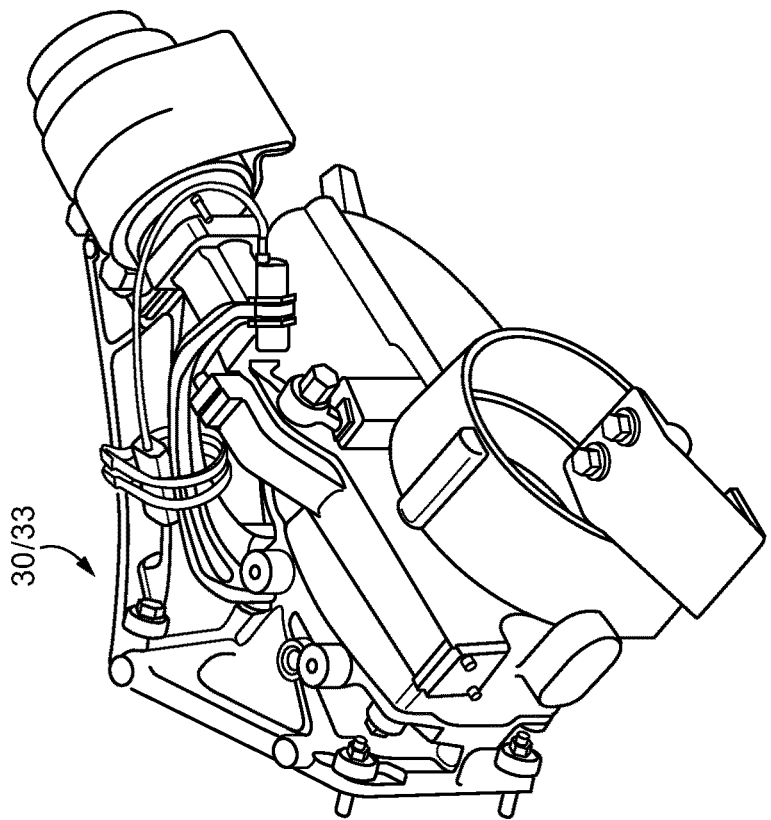
FIG. 4 is a diagrammatic view of a left-hand and a right-hand shutoff valve and stabilizer assembly, according to one embodiment.
Figure 4:
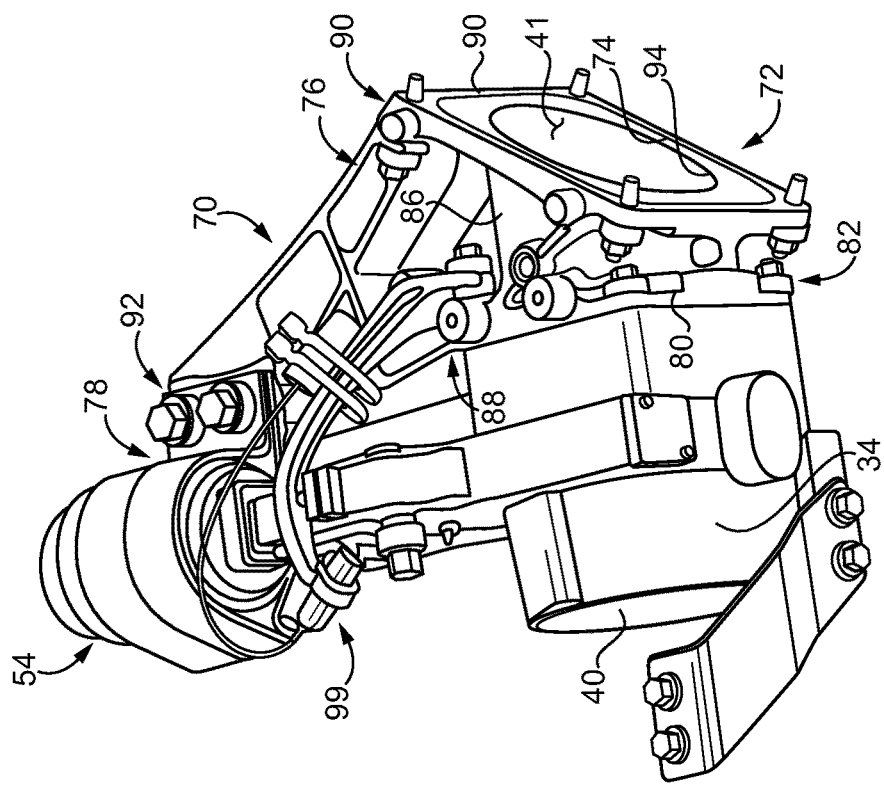

To this end, system 30 further includes a stabilizer 70 for electrical valve actuator 52. In FIG. 1 stabilizer 70 is shown associated with shutoff valve 32, and a stabilizer 71 associated with shutoff valve 33. Referring also now to FIG. 4, there are illustrated both a left-hand shutoff valve such as shutoff valve 32 and a right-hand shutoff valve 33. "Left" and "right" are terms selected arbitrarily. Stabilizer 70 can include a fitting 72 coupled to valve housing 34 and forming an opening 74 to fluid supply conduit 40, and forming a second fluid supply conduit 41 extending inwardly from opening 74 to connect with fluid supply conduit 40. Fluid supply conduits 40 and 41 can be understood as segments of the same conduit. Moreover, the term "supply" should not be taken to indicate a direction of flow. In the illustrated embodiments fluid flows from conduit 40 into conduit 41. Stabilizer 70 also includes a strongarm 76 extending between fitting 72 and solenoid subassembly 54, and a clamp 78 clamping strongarm 76 to solenoid subassembly 54. Fitting 72 and strongarm 76 can be formed integrally in a one-piece casting 95. In the illustrated embodiment fitting 72 has a first mounting flange 80 bolted to valve housing 34 at a bolted joint 82, and a second mounting flange 84 oriented diagonally relative to first mounting flange 80 and bolted to an adjoining housing, such as the housing of aftercooler 28, in fluid supply system 30. A tube or tube section 86 connects between first mounting flange 80 and second mounting flange 84.

Figure 5:
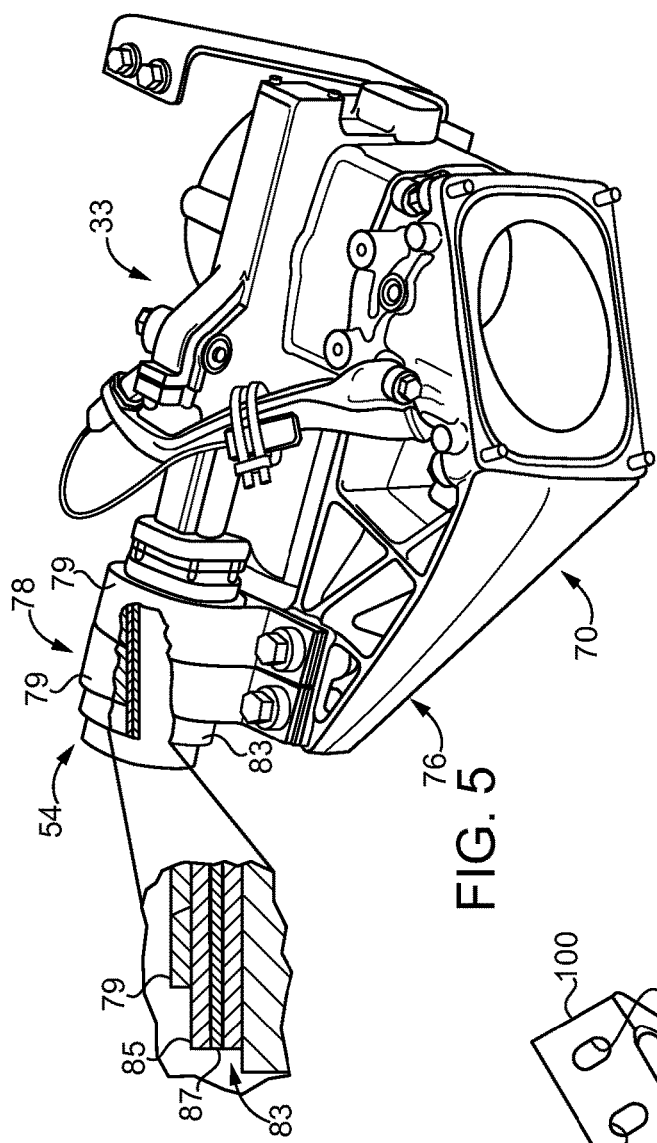
FIG. 5 is a partially sectioned diagrammatic view, including a detailed enlargement, of a shutoff valve and stabilizer assembly, according to one embodiment.

Referring also to FIG. 5, in an implementation clamp 78 includes at least one clamping strap 79 extending about solenoid subassembly 54. In the illustrated embodiment, clamp 78 can include two parallel clamping straps 79 extending circumferentially around solenoid subassembly 54 and bolted to strongarm 76. As also shown in the detailed enlargement of FIG. 5, a vibration-damping grommet 83 is positioned between clamp 78 and solenoid subassembly 54. Stabilizer 70 together with grommet 83 forms a vibration-limiting stabilizer system. Grommet 83 may be held in compression against solenoid subassembly 54 by way of the one or more clamping straps 79. In a further implementation, vibration-damping grommet 83 includes a silicone body 85 and at least one reinforcement layer 87 within silicone body 85. Silicone body 85 may be wrapped such as by applying a silicone tape or tubing, with reinforcement layer 87 including a metallic mesh, screen, braid, or other composition that assists in preventing tearing of grommet 83 in response to shearing forces or the like. In other embodiments multiple reinforcement layers might be provided alternating with multiple layers of silicone body 85.

Figure 7:
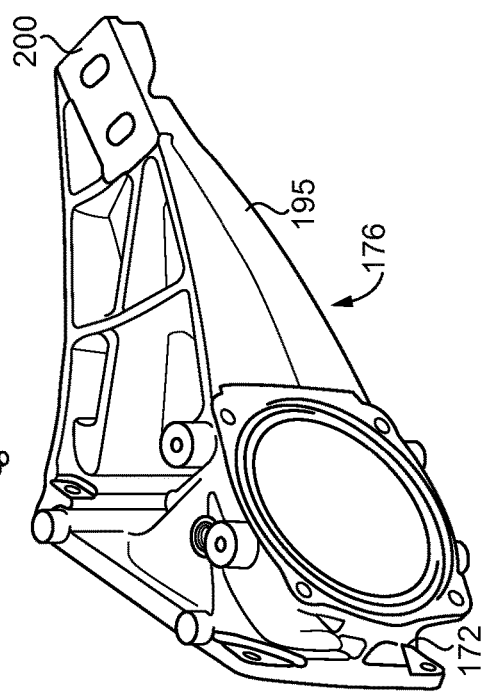
FIG. 7 is a perspective view of a strongarm and fitting for a stabilizer, according to one embodiment.
Figure 6:
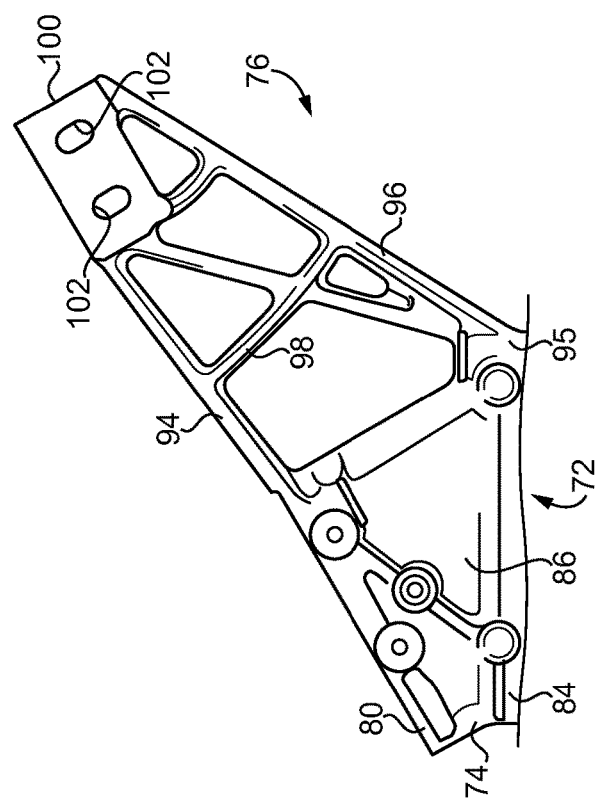
FIG. 6 is a top view of a strongarm and fitting for a stabilizer, according to one embodiment.

Referring also now to FIG. 6, a first connection point 88 may be formed between strongarm 76 and first mounting flange 80. A second connection point 90 may be formed between strongarm 76 and second mounting flange 84. A third connection point 92 may be formed by way of clamp 78 between strongarm 76 and solenoid subassembly 54. Connection points 88, 90, and 92 form a generally triangular pattern. As shown in FIG. 6, strongarm 76 may further include a first side wall 94 extending between first connection point 88 and third connection point 92. A second side wall 96 extends between second connection point 90 and third connection point 92. First side wall 94 and second side wall 96 can be seen to generally be angled toward and approach one another in a direction of third connection point 92. Each of first side wall 94 and second side wall 96 has a height that decreases in the direction of third connection point 92. Also shown in FIG. 6 is at least one internal stiffening wall 98 that extends between first side wall 94 and second side wall 96. The internal stiffening wall identified with reference numeral 98 in FIG. 6 extends generally orthogonally to first side wall 94. Other internal stiffening walls have different orientations. A clamp mount 100 is connected with each of first side wall 94 and second side wall 96 and has a plurality of bolt holes 102 formed therein for receiving bolts to form a bolted connection with clamp 78 and thereby clamp strongarm 76 to solenoid subassembly 54. FIG. 7 illustrates a one-piece casting 195 having a strongarm 176 coupled with a fitting 172 and including a clamp mount 200. It will be recalled that strongarm-fitting configurations could be mirror images in a right-handed versus a left-handed stabilizer 70 and shutoff valve assembly. One-piece casting 95 could be used in connection with shutoff valve 32, and one-piece casting 195 could be used in connection with shutoff valve 33, for example. In other instances the same hardware could be used on both a first and a second air subsystem in an engine.

INDUSTRIAL APPLICABILITY

Referring to the drawings generally, when system 10 is operating normally each of shutoff valve 32 and shutoff valve 33 will typically be in an open position, with compressed intake air for engine 12 conveyed through each of shutoff valves 32 and 33 and into aftercooler 28. As illustrated, a single aftercooler fed by fluid supply conduits formed in part by shutoff valve 32 and shutoff valve 33 could be used, with each of fitting 72 and fitting 172 being bolted to a housing of aftercooler 28. In other embodiments multiple aftercoolers might be used. In still other instances, where fluid supply system 30 is used in a different application no aftercooler might be needed. For instance, one or more shutoff valves designed according to the teachings set forth herein could be used in a feedstock or fuel supply in various industrial, power generation or fluid conveyance applications.

Valve-actuating spring 60 may be in a compressed state biasing valve member 50 toward its closed position, with valve member 50 being held in its open position by way of engagement of latch 64 with pin 66. When appropriate criteria are observed, such as engine 12 exceeding a pre-defined engine speed criterion, electrical valve actuator 52 can be operated to energize solenoid 58 and cause pin 66 to move out of engagement with latch 64 and latching surface 68. With pin 66 retracted, valve-actuating spring 60 can cause valve member 50 to swing from its open position to its closed position, shutting of air flow to starve engine 12 of air. With both shutoff valves tripped, engine 12 will shut down operation. As noted above, various criteria can trigger and/or justify triggering shutoff valve actuation. In one implementation, engine speed monitoring can be used. In others, the composition of the incoming air/fluid flow could be sensed. System 30 can also be equipped with a sensor 99 that monitors externally a state of shutoff valve 32 to determine if shutoff valve 32 is in fact open or closed. Stabilizer 70, grommet 83, and sensor 99 along with suitable mounting and clamping hardware could be provided in a service package for retrofitting into an existing system. Once triggered to close, shutoff valves according to the present disclosure will typically be manually opened. As discussed above, attenuating vibrations, and stabilizing electrical valve actuator 52, and solenoid subassembly 54 in particular, against vibrations and deflection, can result in less wear on valve parts than might otherwise be expected, and therefore an expectation of reduced false tripping or failure to trip than what might otherwise be observed.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A vibration-limiting stabilizer system for an electrical valve actuator in a shutoff valve of a fluid supply system comprising:
    a stabilizer including a fitting having a tube section forming a fluid supply conduit and extending between a first mounting flange structured to couple with a valve housing of the shutoff valve and a second mounting flange;
    the stabilizer further including a strongarm attached to the fitting and including a first side wall connected to the first mounting flange, and a second side wall connected to the second mounting flange, and the first side wall and the second side wall extending outwardly from the first mounting flange and the second mounting flange, respectively, to a clamp mount; and
    the stabilizer further including a clamp positionable upon the clamp mount and including at least one clamping element structured for clamping a solenoid assembly of the electrical valve actuator to the strongarm.

2. The stabilizer system of claim 1 wherein the second mounting flange is oriented diagonally relative to the first mounting flange.

3. The stabilizer system of claim 2 wherein the strongarm further includes a plurality of stiffening walls extending between the first side wall and the second side wall at locations between the fitting and the clamp mount.

4. The stabilizer system of claim 1 wherein the at least one clamping element includes at least one clamping strap.

5. The stabilizer system of claim 4 further comprising a vibration-limiting grommet positionable between the at least one clamping strap and the solenoid assembly.

6. The stabilizer system of claim 5 wherein the vibration-limiting grommet includes a silicone body and at least one reinforcing layer within the silicone body.

7. A vibration-limiting stabilizer comprising:
    a fitting including a tube section forming a fluid supply conduit and having a first tube section end and a second tube section end, a first mounting flange extending peripherally around the fluid supply conduit and connected to the first tube section end, and a second mounting flange extending peripherally around the fluid supply conduit and connected to the second tube section end; and
    a strongarm attached to the fitting and including a clamp mount, a first side wall extending between the first tube section end and the clamp mount, a second side wall extending between the second tube section end and the clamp mount, and at least one stiffening wall extending between the first side wall and the second side wall.

8. The vibration-limiting stabilizer of claim 7 wherein the first side wall is elongate and originates at the first mounting flange and terminates at the clamp mount, and the second side wall is elongate and originates at the second mounting flange and terminates at the clamp mount.

9. The vibration-limiting stabilizer of claim 7 wherein the first side wall and the second side wall define a vertical height direction, and a plurality of bolt holes are formed in the clamp mount and extend in the vertical height direction through the clamp mount.

10. The vibration-limiting stabilizer of claim 9 wherein the clamp mount includes an outer peripheral surface, and a mounting face oriented horizontally and extending peripherally outward from the plurality of bolt holes to the outer peripheral surface.

11. The vibration-limiting stabilizer of claim 10 wherein each of the plurality of bolt holes has an oval shape.

12. The vibration-limiting stabilizer of claim 7 wherein the first side wall and the second side wall are oriented diagonally to one another and together form a side wall angle opening in a direction of the tube section.

13. The vibration-limiting stabilizer of claim 12 wherein the first mounting flange and the second mounting flange are oriented diagonally to one another and together form a mounting flange angle opening in a direction of the clamp mount.

14. The vibration-limiting stabilizer of claim 13 wherein the fluid supply conduit opens within each of the first mounting flange and the second mounting flange.

15. The vibration-limiting stabilizer of claim 7 wherein a first connection point is formed between the strongarm and the first mounting flange, a second connection point is formed between the strongarm and the second mounting flange, and the first connection point, the second connection point, and the clamp mount are arranged in a triangular pattern.

16. The vibration-limiting stabilizer of claim 15 wherein each of the first side wall and the second side wall has a height that is decreased in a direction of the clamp mount.

17. The vibration-limiting stabilizer of claim 16 wherein the tube section and the strongarm are formed integrally in a one-piece casting.

18. A vibration-limiting stabilizer comprising:
    a one-piece casting including a fitting having a tube section forming a fluid supply conduit and extending between a first tube section end and a second tube section end;
    a first mounting flange connected to the first tube section end and extending peripherally around the fluid supply conduit;
    a second mounting flange connected to the second tube section end and extending peripherally around the fluid supply conduit;
    a strongarm attached to the fitting and including a clamp mount, a first side wall extending between the first mounting flange and the clamp mount, and a second side wall extending between the second mounting flange and the clamp mount and oriented diagonally relative to the first side wall.

19. The vibration-limiting stabilizer of claim 18 wherein the first mounting flange is oriented diagonally relative to the first mounting flange.

20. The vibration-limiting stabilizer of claim 18 wherein the strongarm further includes a plurality of stiffening walls extending between the first side wall and the second side wall at locations between the fitting and the clamp mount.

* * * * *